(No Model.)

C. W. GOODING & B. CROSSAN.
DASH BOARD.

No. 472,450. Patented Apr. 5, 1892.

Witnesses L. S. Elliott
E. W. Johnson

Charles W. Gooding
and
Bayard Crossan.
Inventors,
by _____ Attorney

UNITED STATES PATENT OFFICE.

CHARLES W. GOODING AND BAYARD CROSSAN, OF WILMINGTON, DELAWARE.

DASH-BOARD.

SPECIFICATION forming part of Letters Patent No. 472,450, dated April 5, 1892.

Application filed December 10, 1891. Serial No. 414,619. (No model.)

*To all whom it may concern:*

Be it known that we, CHARLES W. GOODING and BAYARD CROSSAN, citizens of the United States of America, residing at Wilmington, in the county of New Castle and State of Delaware, have invented certain new and useful Improvements in Dash-Boards; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in dash-boards.

The object of the invention is to provide an improved means for connecting the dash-board to the body of the vehicle, so that said board can be turned to a rearward inclined position to permit the shafts to be elevated to a substantially vertical position, and when so turned vehicles can be stored to occupy much less space than heretofore; and the invention consists in providing the vehicle-body with a dash-foot having a hinge, the parts being adapted to be locked to each other, so as to hold the dash-board in a fixed vertical position and when the parts are unlocked permit the dash to be swung to a horizontal position, as will be hereinafter fully set forth, and particularly pointed out in the claims.

Figure 1:
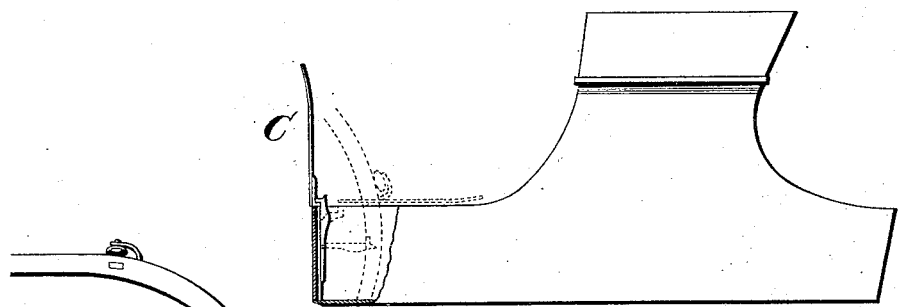
Figure 3:
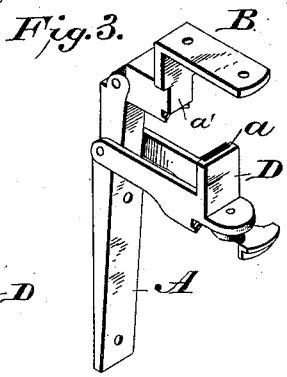
Figure 2:
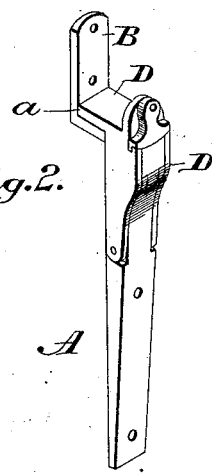
Figure 4:
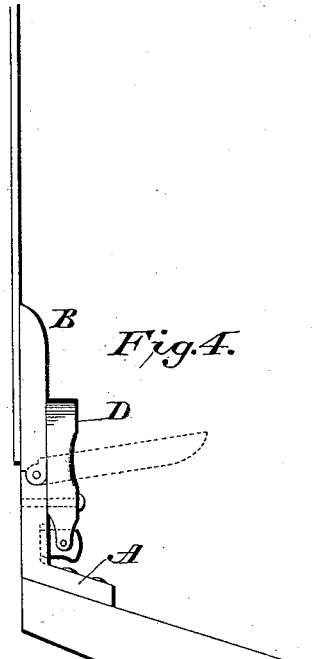
Figure 5:
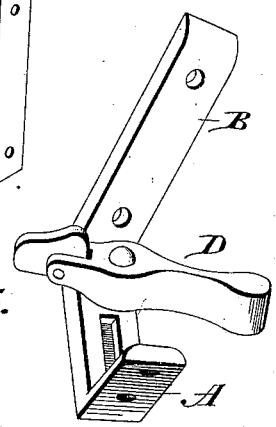

In the accompanying drawings, forming part of this specification, Figure 1 is a side elevation showing our improvement applied to a buggy having a straight or vertical front portion, the dash-board being shown in full lines in a vertical position and in dotted lines turned to a horizontal position, the thills also being shown in dotted lines as elevated. Figs. 2 and 3 are perspective views of the construction shown in Fig. 1. Fig. 4 is a side elevation showing a modified construction adapted to vehicles having an inclined front portion. Fig. 5 is a perspective view of the construction shown in Fig. 4.

A refers to the lower or base portion of the foot, which is rigidly connected by bolts to the frame of the vehicle. To this portion is attached by a hinge or rule joint the section B, to which the dash-board C is rigidly secured.

In connecting these parts we prefer to use a rule-joint, as such a joint will prevent the parts inclining forwardly and form a positive stop when the dash is placed in a vertical position.

D designates a lock, which is pivotally attached to the base-piece A, the same being adapted when swung to contact with the section B, so as to hold the foot A and section B in rigid connection with each other. The lock D is retained against movement by a suitable catch or turn-buckle, as shown.

In the trade there are principally two styles of buggies, known as a "box-buggy" and "phaeton," and it is obvious that the same form of foot could not be applied to both styles. Therefore with a box-buggy we use what we have illustrated in Figs. 1, 2, and 3 of the drawings, and the forward projecting portion of the lock used with such construction is provided with a compressible washer $a$, which when the lock is turned to a vertical position will bear upon the shoulder or straight portion $a'$ of the section B. This construction, in connection with the pivoted button, will prevent any rattling of the parts. In Figs. 4 and 5 the lock D is provided with a pivoted catch or button, which enters a recess formed in the foot and will prevent the lock turning upon its pivot until the catch is released. When a dash-board is fixed to the body of a vehicle, it is obvious that the cross-bar of the thills when raised will contact with the board; but with our improvement the board can be lowered, and said cross-bar will then be able to swing over the body of the vehicle and out of the way of the dash-board.

Having thus described our invention, what we claim as new, and desire to secure by Letters Patent, is—

1. In combination with a dash-board, the foot therefor, having a section B connected thereto by a rule-joint, a pivoted lock D, carried by one of the sections and adapted to engage with the other section, so as to hold the parts rigidly against movement, and pivoted means for preventing movement of the lock, substantially as set forth.

2. In a dash-board for vehicles, the combination of a section B, to which the dash-board is rigidly secured, a foot A, adapted to be rigidly secured to the body of a vehicle, the parts being connected to each other by a rule-joint, a lock D, pivoted to the foot and adapted to be swung in engagement with the section which carries the dash-board, and a catch for holding the lock in a fixed position when in engagement with the section B, for the purpose set forth.

In testimony whereof we affix our signatures in presence of two witnesses.

CHARLES W. GOODING.
BAYARD CROSSAN.

Witnesses:
ZACHARIAH G. DENNIS,
CHARLES GREEN.